United States Patent [19]

Agrawal et al.

[11] Patent Number: 4,825,354
[45] Date of Patent: Apr. 25, 1989

[54] METHOD OF FILE ACCESS IN A DISTRIBUTED PROCESSING COMPUTER NETWORK

[75] Inventors: Rakesh Agrawal, Chatham; Ahmed K. Ezzat, New Providence, both of N.J.

[73] Assignee: American Telephone and Telegraph Company, AT&T Bell Laboratories, Murray Hill, N.J.

[21] Appl. No.: 796,863

[22] Filed: Nov. 12, 1985

[51] Int. Cl.[4] ............................................. G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,430,699 | 2/1984 | Segarra et al. | 364/200 |
| 4,530,051 | 7/1985 | Johnson et al. | 364/200 |
| 4,649,473 | 3/1987 | Hammer et al. | 364/200 |

OTHER PUBLICATIONS

D. J. DeWitt et al., "The Crystal Multicomputer: Design and Implementation Experience", *Computer Sciences Technical Report*, #553 (Computer Sciences Department, U. of Wisc., Madison, Sep. 1984.
P. Kavaler et al., "Extending UNIX to Local-Area Networks", *Mini-Micro Systems*, Sep., 1983, pp. 197-202.
B. Walker et al., "The LOCUS Distributed Operating System", *Acm*, 1983, pp. 49-70.

*Primary Examiner*—David L. Clark
*Attorney, Agent, or Firm*—Jerry W. Herndon

[57] ABSTRACT

A method of performing remote process execution in a computer network. A remote process execution request, including an identification of a process to be executed, is transmitted from a requesting computer to a serving computer. At both the requesting and the serving computers, a file addressing structure is established, so that a file reference by the remote process at the serving computer addresses a file located at the requesting computer. The remote process is activated at the serving computer in response to the remote process execution request. In response to a file reference by the remote process, the file is automatically accessed from the requesting computer in accordance with the addressing structure. The method includes a technique by means of which files may be selectively and automatically accessed from either the requesting or the serving computer, as desired by a user. A computer administrator may selectively override the file accessing instructions, if desired, thereby providing the ability to maintain file security for certain files.

14 Claims, 11 Drawing Sheets

FIG. 2
PROCESS TABLE

| STATUS |
|---|
| SERVER ID |
| PROCESS IDENTIFICATION (PID) |
| PARENT PROCESS IDENT. (PPID) |
| PROCESS GROUP IDENT. (PGRP) |
| SIGNAL DISPOSITION INFO (EXEC) |
| PROCESS PRIORITY VALUE (NICE VALUE) |

FIG. 3
U. AREA

| ACCOUNTING INFO |
|---|
| USER IDENTIFICATION |
| FILE PERMISSIONS |
| ALTERNATE ROOT MODE |
| DEFAULT ROOT MODE |
| PRESENT DIRECTORY |
| OPEN FILE DESCRIPTORS |

FIG. 4
SYSTEM VARIABLES

| SYSID |
|---|
| DISALLOWED |

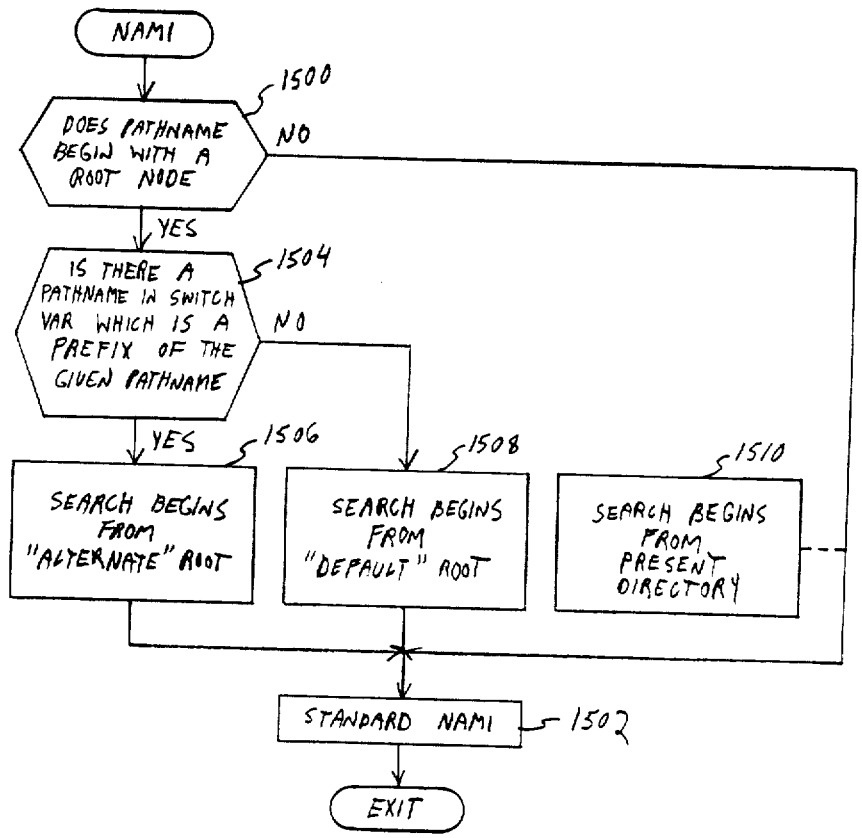

METHOD OF FILE ACCESS IN A DISTRIBUTED PROCESSING COMPUTER NETWORK

TECHNICAL FIELD

The invention relates to computer networks in general and, in particular, to the sharing of computer resources among the individual computers of such networks for distributed and parallel processing.

BACKGROUND OF THE INVENTION

Much effort is presently focused toward providing distributed processing in computer networks. Distributed processing provides improved efficiency in networks by balancing loads between computers that are congested and those which have spare capacity. Users might, for example, offload particularly time consuming tasks, such as text formatting or floating point calculations, from their home computers to computers specially adapted for some tasks.

A number of systems presently provided process sharing between their computers. The LOCUS system, described by G. Popek et al in "A Network Transparent High Reliability Distributed System, *Proceedings of ACM-SIGOPS 8th Symposium on Operating Systems Principles,* December 1981, pages 169–177, conditions a network of computers to simulate a single virtual computer. It does this, in part, by requiring that all files have a unique network name regardless of the network computer on which they reside. This technique, while successful, undesirably sacrifices much of the autonomy of individual network computers in many cases.

C. Antonelli et al describe another computer sharing arrangement in "SDS/NET--An Interactive Distributed Operating System", *IEEE COMPCON,* September 1980, pages 487–493. The University of California at Berkeley provides a form of remote computer sharing in its software called Berkeley Software Distribution 4.2. A system called Altos-net is described by P. Kavaler and A. Greenspan in "Extending UNIX to Local-Area Networks", *Mini-Micros Systems,* September 1983. A system called Uux is described by D. Nowitz and M. Lesk in "Implementation of a Dial-up network, of UNIX Systems", *IEEE COMPCON,* September 1980, pages 483–486. These systems, however, have the undesirable characteristic that each network computer sees only its own file system. This means that the result of executing a process may be dependent upon the computer upon which the process is executed. That is, a process executed locally on a log-in computer of a user may produce an answer different from that which might be produced were the process executed on another network computer.

SUMMARY OF THE INVENTION

We overcome the limitations of the prior art in a method of performing remote process execution in a computer network.

A remote process execution request, including an identification of a process to be executed, is transmitted from a requesting one of the computers to a serving one of the computers. At both the requesting and the serving computers, a file addressing structure is established, so that a file reference by the remote process at the serving computer addresses to a file located at the requesting computer. The remote process is activated at the serving computer in response to the remote process execution request. In response to a file reference by the remote process, the file is automatically accessed from the requesting computer in accordance with the addressing structure.

In the preferred and disclosed embodiment, this result is achieved, in part, by establishing one or more communication channels in the requesting computer for file access by the serving computer, and including in the remote execution request message information by which the serving computer may address the communication channels.

Among the communication channels thus established is a completion channel by which a signal signifying completion of the remote process is communicated to the client process at the requesting computer, a channel for file access from the present directory of the client process and channels for access to any specific files that were opened by the client process before the remote execution request message was transmitted.

The remote execution request is generated in response to a command from the user identifying the process to be remotely executed. The remote execution request message includes information stored at the requesting computer describing the operating environment of the user process. In response to the remote execution request at the server computer, a remote process is established to service the request. Initially, the remote process establishes an operating environment for the remote process using the operating environment information in the remote execution request message.

In the preferred embodiment, the file systems of the network computers are hierarchically arranged into a tree structure of directories, beginning with a root directory with files stored within the directories. In accordance with an aspect of the invention, each computer process has associated with it a default root directory pointer and an alternate root directory pointer. At the serving computer, the state of the default root directory pointer associated with the remote process is set to point to the root directory of the requesting computer and the state of the alternate root directory pointer is set to point to the root directory of the serving computer.

In response to a file reference by the remote process, the file information from the requesting computer, included in the remote execution request message, controls whether the default or the alternate root directory pointer is used to search for the referenced file.

In accordance with another aspect of the invention, each computer has a local DISALLOWED variable, which may contain file search information, coordinated by a system administrator, for example, that renders some files at the serving computer secure from access by the remote process. In response to the remote execution request message, the file information in the request is compared to the information in the DISALLOWED variable and certain file search information is deleted from that contained in the request message according to the contents of the DISALLOWED variable.

Our preferred and disclosed embodiment operates within the context of a version of the UNIX (trademark of AT&T) operating system. UNIX operating systems are available under license from AT&T Technologies, Inc., a subsidiary of American Telephone and Telegraph, Inc.

BRIEF DESCRIPTION OF THE DRAWING

In the drawing,

FIGS. 2 and 3 shows further details of portions of the data structure of FIG. 1 called, respectively, the process table (contains data for each process in the system) and the u.area table, which contains user specific data;

FIG. 4 illustrates certain system (computer) variables used by the invention.

FIG. 15 illustrates modifications in accordance with the invention of an otherwise standard UNIX system function nami, which generates file addresses in response to file access calls. The modifications allow the generation of an address and the access of a file on either a server or a client computer, as required.

GENERAL DESCRIPTION OF THE UNIX OPERATING SYSTEM

Figure 1:
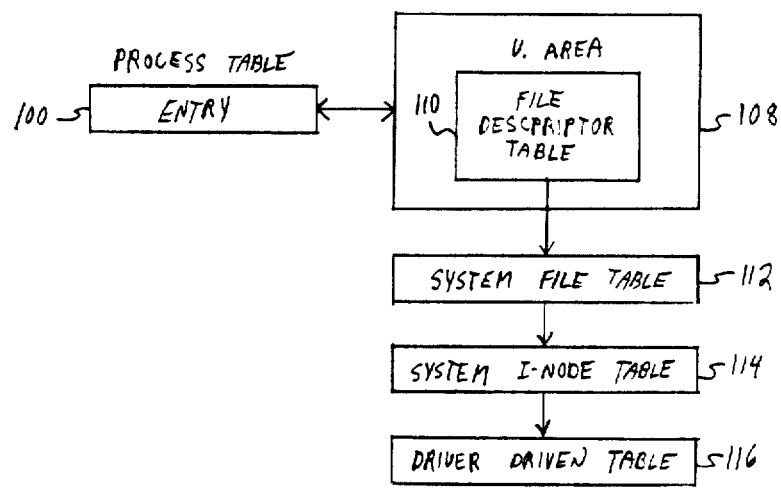
FIG. 1 shows a simplified block diagram of the internal data structure of a UNIX operating system.

Different versions of the UNIX operating system are commercially available under license from AT&T Technologies.

The most important role of the system is to provide a computer controlled environment for task dispensing and a file system. There are three kinds of files in a UNIX system: ordinary files, directories and special files. Each file has a filename. An ordinary file contains whatever information the user places in it, for example, test or executable programs. Directories provide the mapping between the names of files and the files themselves. Each user has a home directory of his or her own files; a user may also create other directories linked to the home directory to contain groups of files which are conveniently located together. The system maintains several directories for its own use. One of these is the root directory. All files in the system can be found by tracing a path through a stated chain of directories until the desired file is reached. The starting point for such searches is often the root, although it may begin at any directory. Other system directories contain programs provided for general use. System commands, which are really just programs, are provided this way. When the name of a file is specified to the system, it may be in the form of a path name, which is a sequence of directory names separated by slashes, "/", and ending in a file name. If the sequence begins with a slash, the search begins in the root directory. Otherwise, it begins at the user's present directory. The name/alpha/beta/gamma causes the system to search the root for directory alpha, then to search alpha for directory beta, and finally to find file gamma in beta. Gamma may be an ordinary file or a special file. The name alpha/beta specifies the file named beta in subdirectory alpha of the user's present directory. The simplest kind of name, for example, alpha, refers to a file that itself is found in the present directory.

Each supported I/O device is associated with at least one special file. Special files are read and written just like ordinary files, but requests to read or write result in activation of the associated device. Special files exist for each communication line, each disk, each tape drive, and for physical main memory. Each user of the system is assigned a unique user identification number. When a file is created, it is marked with the user ID of its owner. Also given for new files is a set of protection bits which specify read, write, and execute permission for the owner of the file, for other members of a user group, and for all remaining users.

System calls are used to perform input and output (I/C) in the UNIX system. To illustrate the essentials of I/O, some of the basic calls are summarized below without getting into the underlying complexities. The system calls are fully described in the *UNIX System V Programmer Reference Manual*, which is available from AT&T Technologies.

To read or write an existing file, it must first be opened. The "open" system call returns a value called a file descriptor, which is small integer used to identify the file in subsequent system calls.

To create a new file or completely rewrite an old one, a "create" system call is used. "create", like "open", returns a file descriptor. Once a file is open, "read" and "write" calls may be used to access the file.

As mentioned above, a directory entry contains only a name for an associated file and a pointer to the file itself. This pointer is an integer called the i-number (for index number) of the file. When the file is accessed, its i-number is used as an index into a system table (the i-list) stored in a known part of the device on which the directory resides. The entry found thereby (the file's i-node) contains a file description comprising, among other things the user ID of its owner, its physical address, its size and a code indicating whether it is a directory, an ordinary file, or a special file. An "open" or "create" call turns the path name given by the user into an i-node number by searching the named directories. Once a file is open, its i-node number is stored in i-node table (see 114 of FIG. 1), a pointer is made from a system file table (FIG. 1-112) to this entry in the i-node table and another pointer is placed in a u.area entry (FIG. 1-110) associated with this process to this entry in the file system table. When a new file is created, an i-node is allocated for it and a directory entry is made that contains the name of the file and the i-node number.

The foregoing discussion applies to ordinary files. When an I/O request is made to a file whose i-node indicates that it is special, the i-node specifies an internal device name, which is interpreted as a pair of numbers representing, respectively, a device type and subdevice number. The device type indicates which system routine will deal with I/O on that device; the subdevice number selects, for example, a disk drive attached to a particular controller or one of several similar terminal interfaces.

An executing program is said to be a process. In general, a new process can come into existence only by use of the "fork" system call. When "fork" is executed, the executing process splits into two independently executing processes. The two processes have independent copies of the original memory image, and share all open files. The two processes differ only in that one is considered the parent process and the other a child process. Both parent and child have unique process identifications (pid).

Processes may communicate with related processes using the same system read and write calls that are used for file-system I/O. The call: filep =pipe ($\Delta$) returns a file descriptor filep and creates an inter-process channel called a pipe. This channel, like other open files, is passed from parent to child process in the image by the fork call. A read using a pipe file descriptor waits until another process wires using the file descriptor for the same pipe. At this point, data are passed between the images of the two processes. Neither process need know that a pipe, rather than an ordinary file is involved.

Another system function is invoked by the execute system call "exec", which requests the system to read in and execute a named program, while passing it arguments in the call. All the code and data in the process invoking exec is replaced from the executed file, but open files, current directory, and inter-process relationships are unaltered. Only if the call fails, for example, because the executed file could not be found or because its execute-permission bit was not set, does a return take place for the execute function.

If a program, say the first pass of a compiler, wishes to overlay itself with another progam, say the second pass, then it simply exec's the second program. If a program wishes to regain control after exec'ing a second program, it forks a child process. The child exec's the second program and the original parent process waits for the child.

Process synchronization is accomplished by having processes wait for events. Events are represented by arbitrary integers. Events are chosen to be addresses of tables associated with those events. For example, a process that is waiting for any of its children to terminate will wait for an event that is the address of its own process table entry. When a process terminates, it signals the event represented by its parent's process table entry. Similarly, signaling an event on which many processes are waiting will wake all of them up.

Another system function "wait" cause its caller to suspend execution until one of its children has completed execution. Then wait returns the pid of the terminated process.

Lastly, the function call exit (status) terminates a process, destroys its image and closes its open files. The parent is notified through the wait function, and status is made available to it. Processes may also terminate as a result of various illegal actions or user-generated signals. Signals are discussed in more detail below, because the processing of them in a remote process execution environment forms one aspect of our invention.

Many system calls exist other than those mentioned above, which are not necessary to discuss for an understanding of the invention. The reader is referred to the above-mentioned reference manual for details.

For most users, communication with the system is carried on with the aid of a program called the shell. The shell is a command-line interpreter; it reads lines typed by the user and interprets them as requests to execute other programs. A command line consists of a command name followed by arguments to the command. The shell splits up the command name and the arguments into separate strings. Then a file with name "command" is sought; "command" may be a path name including the "/" character to specify any file in the system. If "command" is found, it is brought into memory and executed. The arguments collected by the shell are accessible to the command. When the command is finished, the shell resumes its own execution, and indicates its readiness to accept another command by typing a prompt character. Programs executed by the shell start off with three open files with file descriptors 0, 1 and 2. As such a program begins execution, file 1 is open for writing, and is best understood as the standard output file. This file is usually the user's terminal. Thus programs that wish to write informative information ordinarily use file descriptor 1. Conversely, a standard input file 0 starts off open for reading (usually from the user's keyboard), and programs that wish to read messages typed by the user read this file. File descriptor 2 is reserved for the reception of error messages.

The shell is able to change the standard assignments of these file descriptors from the user's terminal and keyboard. If one of the arguments to a command is prefixed by ">", file descriptor 1 will, for the duration of the command, refer to the file named after the ">". This is called file redirection.

Most of the time the shell is waiting for the user to type a command. When the newline character ending a line is typed, the shell's read system call returns. The shell then analyzes the command line, putting the arguments in a form appropriate for an execute call. Then fork is called. The child process, whose code of course is still that of the shell, attempts to perform an execute with the appropriate arguments. If successful this will bring in and start execution of the program whose name was given. Meanwhile, the other process resulting from the fork, which is the parent process, waits for the child process to complete and vanish. When this happens, the shell knows the command is finished, so it types its prompt and reads file descriptor 0 to obtain another command.

All of this mechanism meshes nicely with the notion of standard input and output files. When a process is created by the fork function, it inherits not only the memory image of its parent but also all the files currently open in its parent, including those with file descriptors 0, 1, and 2. The shell, of course, uses these files to read command lines and to write its prompts and error messages, and in the ordinary case its children —the command programs—inherit them automatically.

DETAILED DESCRIPTION

A process table, shown in FIG. 1, contains a process entry, such as 100, for each process in the system. Each process in the system also has associated with it a user area, u.area 108, in main memory. The process table entry 100 points to the u.area 108 associated with the process and vice versa. Each file that has been opened by a process is identified by a file descriptor number contained in a file descriptor table 110 in u.area 108. File descriptor numbers are translatable throughout a system file table 112 and a system i-node table 114 to identify unique device drivers for accessing files.

A process table is shown in more detail in FIG. 2. Each entry has, for example, a STATUS variable, containing one of several values describing the present state of a process, the process's identification (pid), the identification of a parent process (ppid), if any, the identity of a group to which this process belongs (pgrp), signal disposition information for the exec system call and a process priority value (referred to as nicevalue in the UNIX system literature). Generally, a process group includes all processes and their children originated as a result of a specific user. Signals are stimuli to a process generated from some source external to the process. Interrupts (break signals generated from a user terminal) and telephone line hangup are examples.

The discussion above has referred to UNIX systems as presently exist apart from our invention. Certain of the items discussed above have been modified in accordance with the invention. For example, a standard process identification (pid) has been described as a unique identification within an individual computer. We redefine pid to be a unique identification for a process within a network of computers. One portion of pid now identifies the network computer on which a process is executing. A second portion is equivalent to the original UNIX system pid. Henceforth, pid refers to the unique process identifier within a network. Other identifiers, such as ppid and pgrp, are to be treated as having similar network wide characteristics in the remainder of this disclosure.

The values which the STATUS variable may acquire are generally not relevant to our invention. However, we have defined a new state, AGENT, for this variable. A process has its variable STATUS set to the state AGENT when the local process had requested a remote process execution. The local requesting AGENT process is simply a place-holding process at the client computer which receives the results of execution when the remote process terminates and which may receive and forward signals to the remote process.

The contents of a u.area are shown in more detail in FIG. 3. Among the data contained there is accounting information used by a system for process scheduling and for user billing and a user log-on identifier. For a given process, a set of default file permissions identify read, write and execution (if the file is a progam) permission for files created by the process for three entities, the file owner, a group to which the file owner belongs and everyone else that has log-on access to this computer.

In addition, the u.area contains entries which define a default root directory pointer, an alternate file system root directory pointer, and a pointer to the present directory of the user. These entries, in part, control file access as required between a client computer and a server computer to maintain a client view of a file system by a server, as will be seen.

FIG. 4 discloses some system (computer) variables that are pertinent to understanding our invention. The SYSID variable contains an identification of the computer with which it is associated. The DISALLOWED variable contains information, put there by a system administrator, for example, that allows the administrator to establish directories on the local machine that are inaccessible, for security reasons, to processes that logically belong to client machines.

Our distributed computing network consists of autonomous, but cooperating personal workstations and computers. In the disclosed and preferred embodiment, each network computer is controlled by a version of a UNIX operating system, although this is not a limitation of the invention. Some or all of the computer in the network may be arranged to form a pool of computer servers that may be used by the workstations to supplement their computing needs in a way that is transparent to users at workstations. By transparent, we mean that a user logged on at one computer may initiate the execution of a process on a different computer server (computer) in the system without any necessity of modifying the process software and with assurance that the results of the process will be the same as if the process were executed on the user's log-in computer.

The network includes an arrangement that allows computers individually to advertise themselves as available as compute servers to some or all other computers in the network and individually to withdraw as compute servers. The method by which computers within the network become compute servers, etc. is the subject matter of our copending U.S. patent application No. 796,864, entitled "Method of Propagating Resource Information in a Computer Network". The contents of this application are hereby incorporated by reference in their entirety.

We turn now to a general discussion of our arrangement that allows remote process execution while preserving the local execution environment of these processes. Our disclosed embodiment runs on AT&T 3B2 computers interconnected with AT&T 3BNET, which is an Ethernet compatible 10 megabits/second local area network. Each computer runs a modified version of the UNIX System V operating system.

Figure 5:
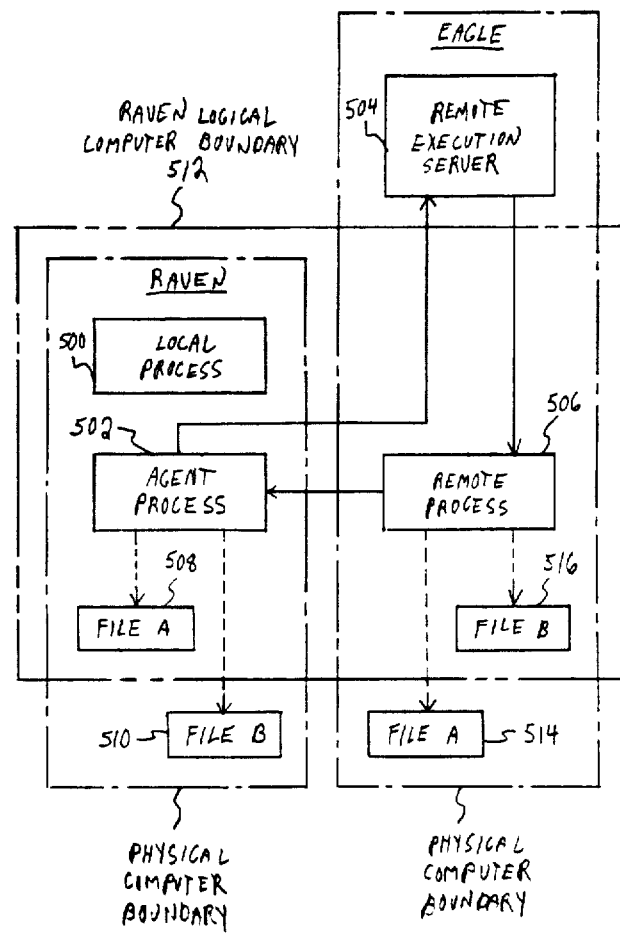
FIG. 5 conceptually illustrates a distinction between physical computers and logical computers as employed in this invention to enable a server computer to access files belonging to a client computer during a remote process execution.

We define a logical machine as a collection of processes (both local and remote) that belong to a physical machine. This concept is illustrated in FIG. 5. There, two computers, RAVEN and EAGLE, are shown. RAVEN is assumed to be a client and EAGLE a server. For illustration, RAVEN is assumed to be executing a local process 500. Another process 502 is shown as an agent process, i.e., the residue of a local process which is awaiting completion by its remote counterpart process 506 in EAGLE. As shown by the closed line 512, the logical computer boundary of RAVEN includes the remote process 506. Note that each computer has two counterpart files, A and B (508 and 510, respectively, in RAVEN and 514 and 516 in EAGLE). With respect to process 502, file 508 is considered to be within the logical boundary of RAVEN, while file 510 is not. Conversely, file 516 at EAGLE is treated as within the logical boundary of RAVEN, while file 514 is not. How this is accomplished is described below.

Figure 6:
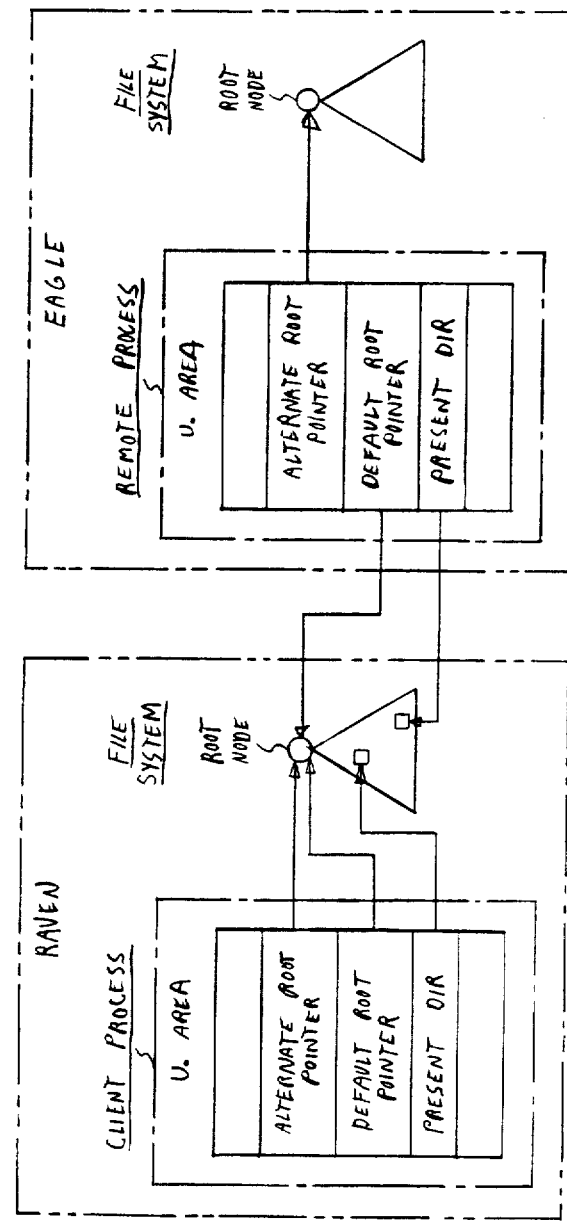
FIG. 6 conceptually illustrates how two file system pointers are maintained on each network computer to enable a server computer to access files belonging to a client computer during a remote process execution.

We treat a computer and its file system as separate and independent resources. Our arrangement preserves all computer capabilities within the boundaries of a logical machine. Process 506 executing remotely at server EAGLE carries with it the view of the file system that exists on the client RAVEN. This can be selectively modified for files, as will be seen. In general, therefore, since file A exists on both computers and remote process 506 references file A, the file made available to the process is file 508 on RAVEN, and not file 514 on EAGLE. In accordance with an aspect of the invention, we are able to accomplish this by defining two root directory pointers for every process on a computer, a default root directory pointer and an alternate root directory pointer. These pointers are maintained in a process's u.area, as already mentioned. The two pointers point to different file system root directories when a process is executing remotely on that computer and to the same file system otherwise. Stated differently, the default root directory pointer always points to the root of the file system on the computer to which the process logically belongs. FIG. 6 illustrates this arangement. There, a remote process is assumed to be in progress on computer EAGLE on behalf of an agent process at computer RAVEN. Thus, both pointers for the client process at RAVEN point to the root directory of RAVEN's file system. However, at the server computer EAGLE, the default root directory pointer also points to the root node at RAVEN, while the alternate root node directory pointer points to its own file system. In other words, when a process is executing on a server computer, the alternate root directory pointer is made to point to the root of the file system of the server.

Standard system utilities are likely to be duplicated at every computer. We should access these files at the remote computer at which the process is executing, rather than accessing them across the network from the client computer. Similarly, temporary files wich are created during the execution of the remote child process are more efficiently created at the server. In accordance with another aspect of the invention, we solve this problem by defining a new environment variable SWITCH, which contains prefixes of file path names that are to be accessed locally, rather than from a client computer. The remote process normally uses the default pointer to access files, but uses the alternate pointer when it wishes to access files located at the server. This is accomplished using the SWITCH variable, as will be described shortly.

A remote process, such as 506, is able to send and receive all standard UNIX system signals to and from any process within the boundary of a logical machine. The UNIX system also provides the facility of grouping processes into a process group. It is possible to send signals to all members of a process group. The process groups are preserved within a logical computer.

Processes in the UNIX system are organized in the form of a tree. The parent-child relationship between the processes is also preserved within a logical machine boundary. Each process in the UNIX system has associated with it a controlling terminal, which generally is the login terminal. Recall that a process is uniquely identified in a network by using a unique identifier generated by the computer on which the process is created, (i.e., the standard UNIX system pid), prepended with a network-wide unique identifier of the computer. Thus, with respect to FIG. 5, if the network identifier of RAVEN is assumed to be C, then the pid of agent process 502 is CD, where D is a local process identifier in RAVEN. The pid of remote process 506 is EF, where E is the network identifier of EAGLE and F is a local process identifier in EAGLE.

Figure 7:
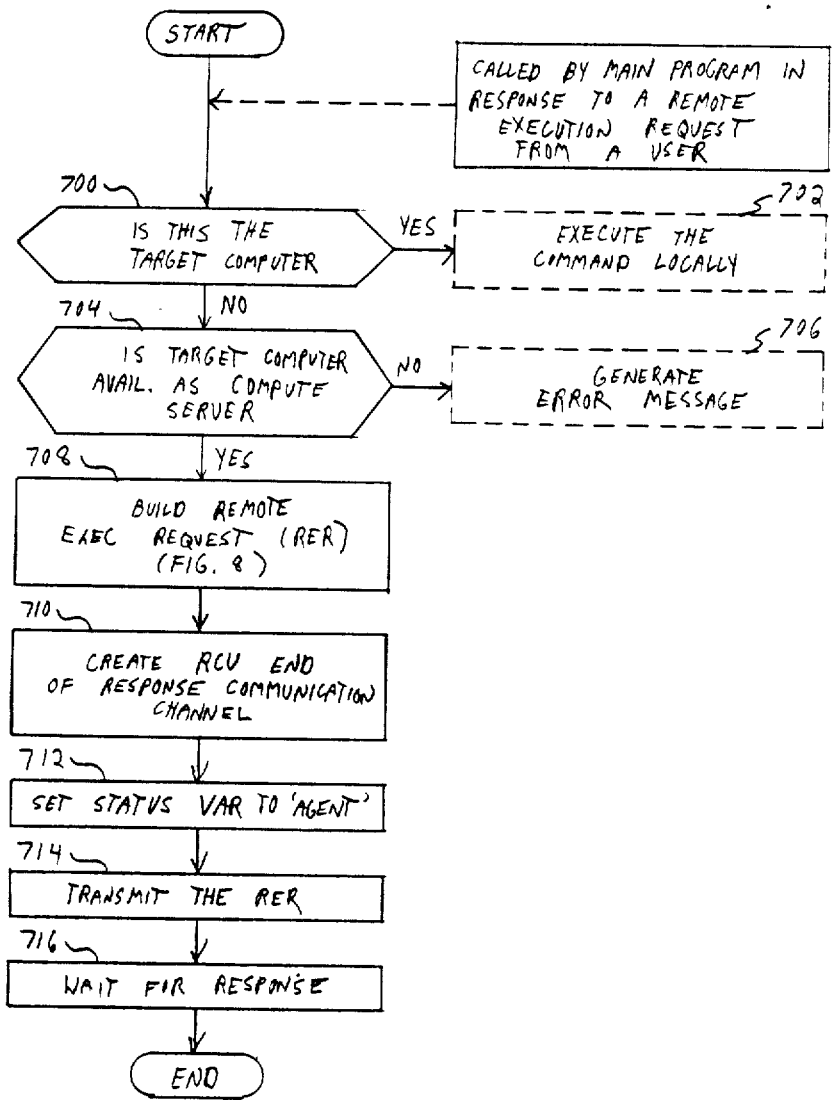
FIGS. 7 through 9 contain illustrative flowcharts of programs at client and server computers which enable remote process execution in accordance with the invention.
Figure 8:
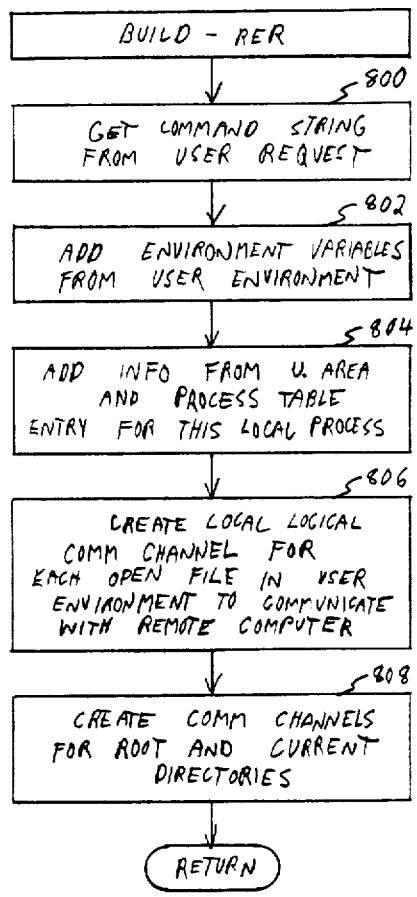

A process execution is initiated by a local computer in response to a request for remote execution (a rexec command) from a user at a terminal served by the local computer, say RAVEN in FIG. 5. The rexec command includes the network identity of the remote computer. A local process is created in response to the user request message and is initially processed in a conventional UNIX system manner. Its pid identifies the local computer and the local process that is created by the rexec command. Thereafter, the program shown in FIG. 7 is executed. This program replaces the original local process and has the same pid as that process. Step 700 first determines if the request is for local or remote execution. If a local execution request has been made, the request is executed normally in a conventional manner, as conceptually illustrated by dotted box 702. If the request is for remote execution, step 704 interrogates a local server database, described in our above-mentioned copending name server patent application, to determine if the requested server is in fact available as a server for the local computer. If not, an error message is generated for the user at step 706 and execution is halted. Otherwise, step 708 builds a remote execution request (RER) message for transmittal to the remote machine. The message may include a compound operation such as a pipe, standard input/output file redirection, background execution, etc. The details of this are shown in FIG. 8. However, the compound operations are not described as this capability is obtained as part of the standard UNIX system capability.

Steps 800 and 802 retrieve all local user environment variables and their defined states and add the variables and states to the user request message. Accounting information, user identification and file permissions for any files that have been opened locally at this point in processing are obtained from the u.area by step 804 and added to the RER by step 804. In addition, step 804 obtains the local process identification (pid), parent process identification (ppid), process group identification (pgrr), signal disposition information and process priority value (nicevalue) from the entry for this local process in the process table (FIG. 2) and adds this information to the RER. Step 806 creates a local receiving communication channel for each local file that has been opened by the user process thus far. This includes the standard input, output and error files. This is done by creating local receive descriptors. Information is sent in the RER message to a server to allow it to address each of the local client receive descriptors for communication and file access between the two computers. To accomplish such communication, counterpart send descriptors will be created at the server using the addressing information in the RER message. Receive and send descriptors are similar to file descriptors, discussed in the General Description section. This arrangement allows remotely executing process to access files on a client computer via these communication channels in a way invisible to a user and using conventional UNIX system facilities. Similarly, local communication channels associated, respectively, with the root and current directories of the local computer are created by step 808. Step 710 in FIG. 7 next creates a local receiving end communication channel over which a remote execution completion signal is returned from the server computer. The receive descriptors for all of the locally created communication channels are included in the RER so that the server computer is able to communicate properly with the local computer. This essentially completes the building of the remote execution request message. Step 712 now sets the STATUS variable in the process table for this process to the state AGENT. The RER message is transmitted to the server computer at step 714. At step 716, this local process places itself in a suspended state awaiting the return of results from the server computer. When the results arrive, the suspended process is effectively reawakened to dispose of the results. The suspension and reawakening is accomplished using conventional UNIX system techniques.

Figure 9:
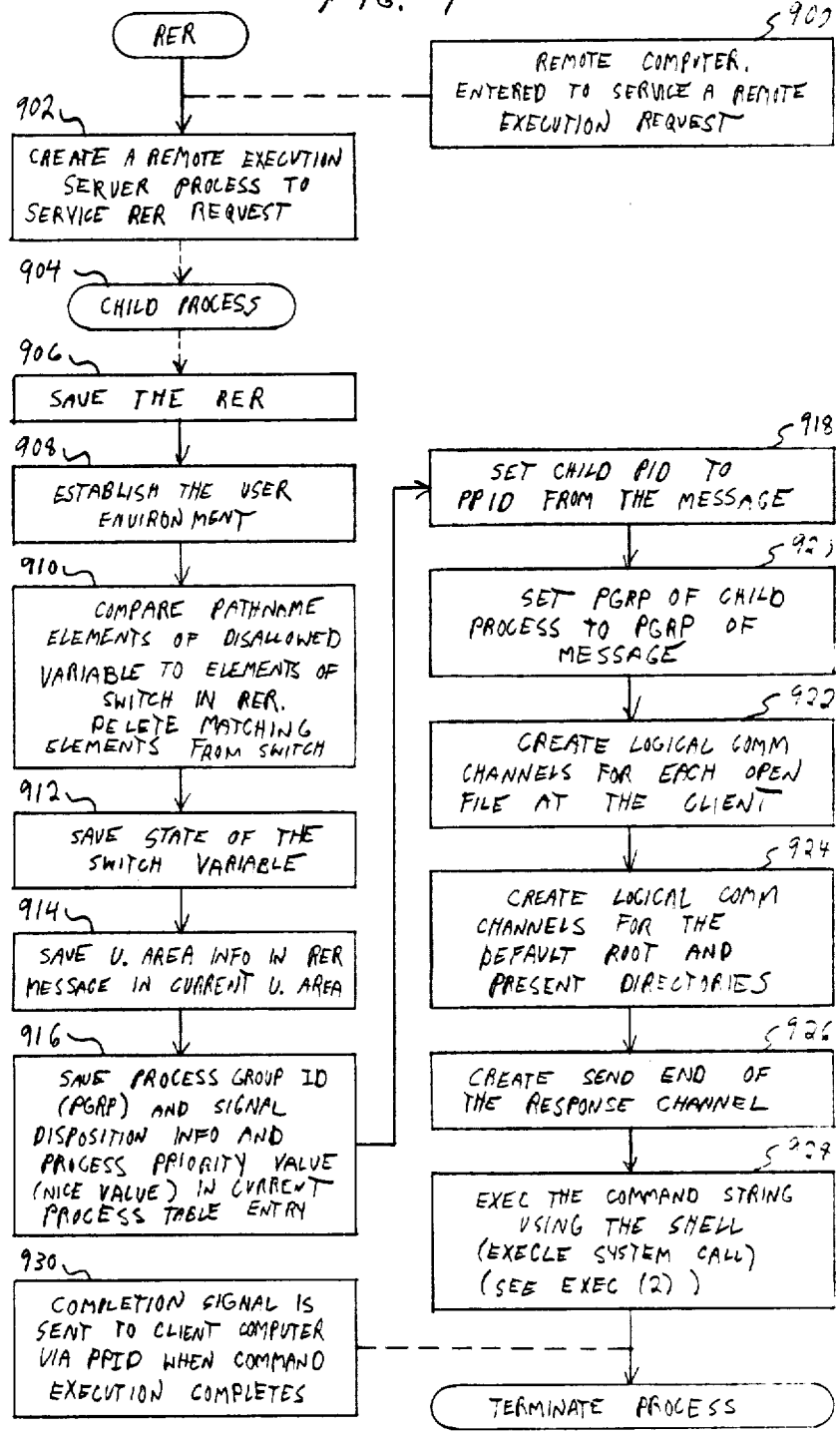

FIG. 9 discloses the process steps executed by a computer to service remote execution request from other computers. The entry point RER is entered under control of the operating system of the computer when an RER arrives. Step 904 creates a child process to service the request. This is accomplished by executing a "fork" command. The child process begins execution at step 906 where the RER message is saved for late reference. The RER message is passed to the child as a side effect of the fork operation. Step 908 establishes the user environment on this computer to resemble that on the user's login computer. This is accomplished primarily by setting the local environment variables for this child process to the values transmitted in the RER message reflecting their states on the client computer.

In accordance with an aspect of the invention, the state of the SWITCH variable for this process on the server is set at step 912 to a state also contained in the RER message. This state is a sequence of one or more directory path names which define where files are to be accessed, from the file system of the server or from the client. However, before this is accomplished, step 910 first filters the SWITCH variable elements from the client through the local system variable DISALLOWED. It may be recalled that DISALLOWED allows a local system administrator to establish directories on the local machine that are inaccessible, for security reasons, to processes that logically belong to client machines. DISALLOWED may contain one or more path name elements defined by the system administrator. Step 910 compares the proposed SWITCH elements in the RER message to each of the DISALLOWED elements. Any of the proposed SWITCH elements that begin with the DISALLOWED element are removed from the proposed list. It is this filtered list of path names that is stored in SWITCH at step 912. Subsequently, when the remote process references a file, it will be obtained from the client machine, unless a path name element in SWITCH is a prefix of the path name of the referenced file, in which case the file is accessed at the server. This is described in more detail below.

Step 914 sets the remaining entries of u.area, such as default file permissions, to the proper states from the information in the RER message. Step 916 saves the process group identification (pgrp), the signal disposition information and the state of nice value from the RER message in the appropriate entry in the server process table.

This remote execution server is eventually replaced by an appropriate program as specified in the RER message, to execute the remote request. (Preparatory to this, step 918 sets the program identification (pid) of this child in the process table to the parent process identification (ppid) sent in the RER message.) Similarly, the process group (pgrp) in the process table of the child to be created is set by step 920 to the pgrp of the parent process on the client computer. Steps 922, 924 and 926 create the counterpart send descriptors for open files at the client computer, for the root and present directories at the client and for the response channel over which results are passed to the client. These send descriptors are created, using standard UNIX utilities, from the client receive descriptor addressing information contained also in the RER message.

The result of the above steps is that the remote child process created thus far has the same environment, process group and other attributes, such as open files, root and current directories, disposition of signals, nice-value etc., as it would have if the process were on the client computer. Step 928 now initiates execution of the remote process by performing an "execle" system call. This system call is a variation of the exec system call and is described in detail in the UNIX system reference manual. We could have "execle'd" the actual command to be remotely processed. However, this would require that the program in FIG. 9 pause and "execle" each component of the command. For example, if the command includes a "pipe" between two processes A and B, the RER server must activate both processes and establish the "pipe" between them. In the case of redirection in the command of the process output to another file, the server must open the redirection file and establish the redirection link to the new file. The UNIX system shell does all of this automatically. Therefore, to take advantage of this, we "execle" the shell with the command as an argument. Execution of the "execle" system call results in the shell replacing the present child process. The shell then completes execution of the command. In the case of a single process command, the shell creates a child shell with the "fork" command, and the child shell overlays itself with the process to be executed. In the case of a "pipe" between processes A and B, for example, the child shell "forks" a grandchild shell and establishes the "pipe" between itself and the grandchild. The child shell then overlays the grandchild shell with process A and itself with process B. Execution of the new processes is automatically initiated. When processes are invoked in this manner by a "execle" system call, at every stage the attributes of the child process are inherited by the new process. Since the remote execution server had set pid to the ppid received in the RER, the ppid of the child points to the parent of the agent process at the client computer.

Figure 10:
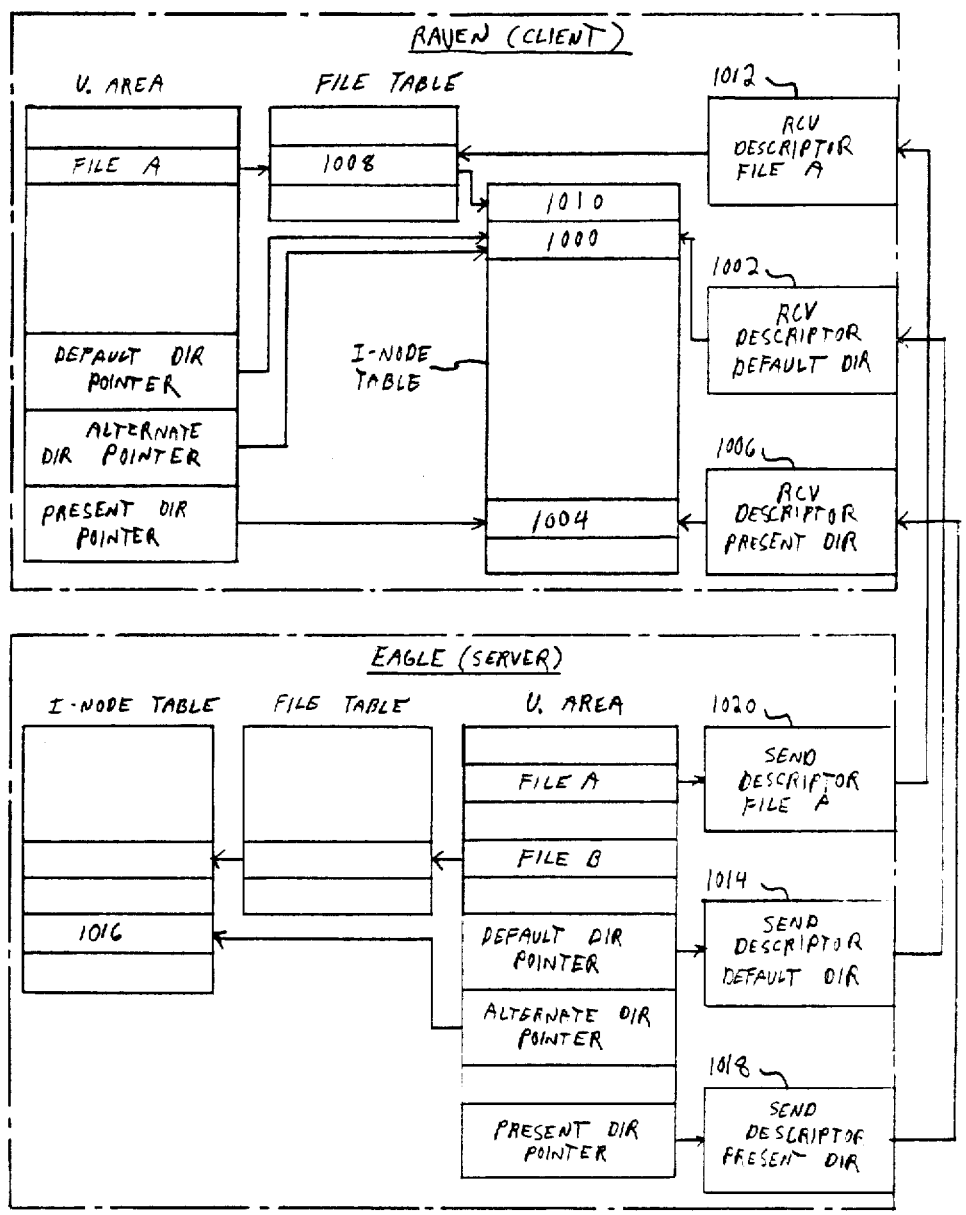
FIG. 10 illustrates data structure arrangements within a requesting and serving computer which allow for automatic file access from a requesting computer in response to a file access by a remote process.

The results of execution of the programs of FIGS. 8 and 9 are illustrated in FIG. 10, assuming that RAVEN is the client and EAGLE is the server. For the client process on RAVEN, the default directory pointer in u.area points to an entry 1000 in the i-node table. Entry 1000 contains the i-node of the RAVEN root directory, which is translatable into a physical memory address. The alternate root directory in u.area also points to i-node 1000, as does a receive descriptor 1002, used for accessing files from EAGLE. The present root directory pointer in u.area points to the appropriate i-node entry 1004 that identifies the present client process directory on RAVEN, as does a receive descriptor 1006, used for present directory file accesses by the remote process.

For illustration, we have assumed that the client process has an open file A on RAVEN. Therefore, u.area contains a file A entry which points to an entry 1008 in the file table. Entry 1008, in turn, points to an appropriate i-node entry 1010. A receive descriptor 1012 points to the file table entry 1008 for remote accesses of file A.

On EAGLE, the default directory pointer in u.area points to a send descriptor 1014 which, in turn, points to the receive descriptor 1002 at RAVEN. The alternate root directory in u.area points to an i-node entry 1016, used for accessing files from EAGLE, when appropriate. The present root directory pointer in u.area points to the send descriptor 1018 for accessing present directory files from RAVEN. Similarly, the file A entry in the EAGLE u.area points to a send descriptor 1020 for accesses of file A on RAVEN. For completeness, we have assumed that the remote process has opened a local file B. Therefore, u.area also contains file B entry that points to the physical address of file B at EAGLE via the file and the i-node tables. The remote process may also open a new file at RAVEN using the default or the present directory pointers. A communications structure is established between the client and the server similar to what has been described above. The reader is referred to a paper, "The Version 8 Network, File System" P. J. Weinberger, *USENIX Conference Proceedings,* Salt Lake City, Utah, June 12, 1984.

In the above arrangement, any reference to a file will be resolved with respect to the file system view of the client computer, unless the state of SWITCH dictates otherwise. It should be noted that this is accomplished automatically with the environment we have now established. If a file is accessed, the receive descriptors and the send descriptors we have established at the server and client, respectively, in conjunction with standard UNIX system features, cause the file to be automatically downloaded from the client computer instead of being accessed from the server file system.

During process execution, file system selection is controlled by a standard UNIX operating system function called nami. Nami is automatically called when a process accesses a file. The standard nami function translates a path name into the actual address of the file in the UNIX operating system. We have modified nami to take into account the presence of the SWITCH and DISALLOWED variables in determining the address and location of a file. This shown by the flowchart in FIG. 15. Nami is entered with the path name of a file as specified by the file referencing process. Step 1500 of modified nami determines if the path name begins at the root directory of the file system. In the UNIX system, a path name beginning with a slash ("/") signifies that the search begins at the root node. If not, the specified path name is given to the standard nami at step 1502, as before, and step 1502 generates the address of the file, using the present directory pointer in the u.area. It should be noted, however, that for a remote process executing on this computer, the present directory pointer points to a directory on the client machine. It is an address of the file in this directory that is returned by modified nami. At step 1500, if the file search begins at a root directory, step 1504 determines which root directory is intended. As mentioned above, it does this by determining if any path name in variable SWITCH is a prefix of the file path name being referenced. If so, then the standard nami function is steered to the remote computer's root directory by step 1506. Otherwise, step 1508 steers standard nami to the agent computer root directory. Thus, by way of example, assuming that SWITCH only contains one path name segment /dir1/dir2, then if a remote process references a file whose path name is /dir1/dir2/dir3/filename, step 1506 is executed. On the other hand, if a file dir1/dir3/filename is referenced, step 1508 is executed.

The programs in FIGS. 11 through 14 relate to signal disposition. Signals are process stimuli that result from external actions, such as an interrupt signal caused by operation of a delete key at a user's terminal or a quit signal caused by loss of a connection to a user's terminal, or from system actions such as a terminate signal generated by a "kill" system call. It is possible that an agent process may receive a signal intended for a remote process that it is representing. For example, in FIG. 5 the process P at the time of forking the process Q, may have obtained its pid, and may send a signal to Q not knowing that Q has exec'ed a remote operation and that Q has become an agent. The standard UNIX system signaling function has been modified so that instead of posting the signal to the agent, it sends a message containing the identity (ppid) of the agent's parent to the server. The signaling function obtains the server identification from the process table in FIG. 2. The server searches for a process which has a ppid equal to that contained in the message and posts the signal to this process.

UNIX system signals are disclosed in the SIGNAL command in section 2 of the UNIX System V, release 2, *Programmer Reference Manual.*

Figure 14:
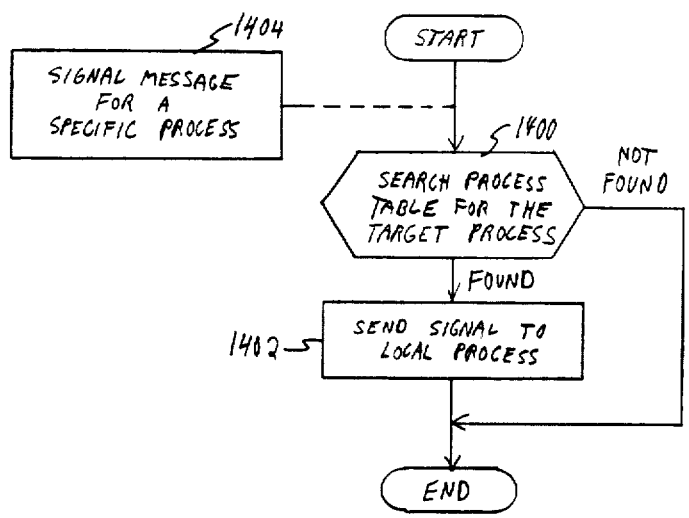
FIGS. 11 through 14 show illustrative program flowcharts that process signals (such as user hang-up) between a client process at a requesting computer and a corresponding remote process.
Figure 12:
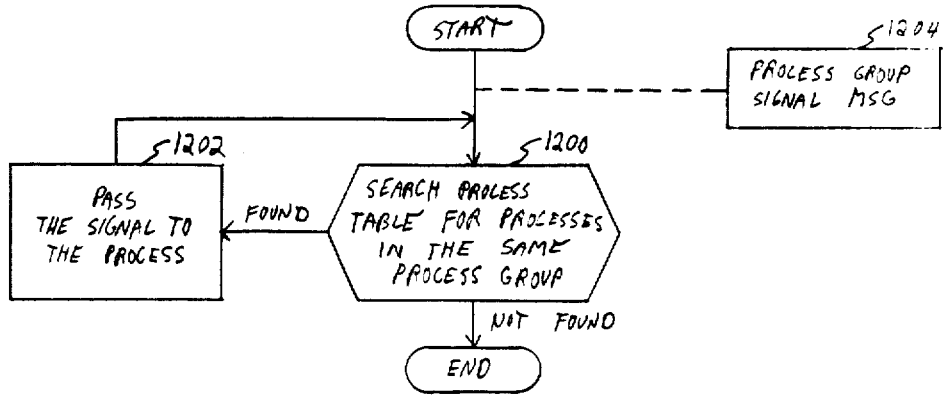
Figure 13:
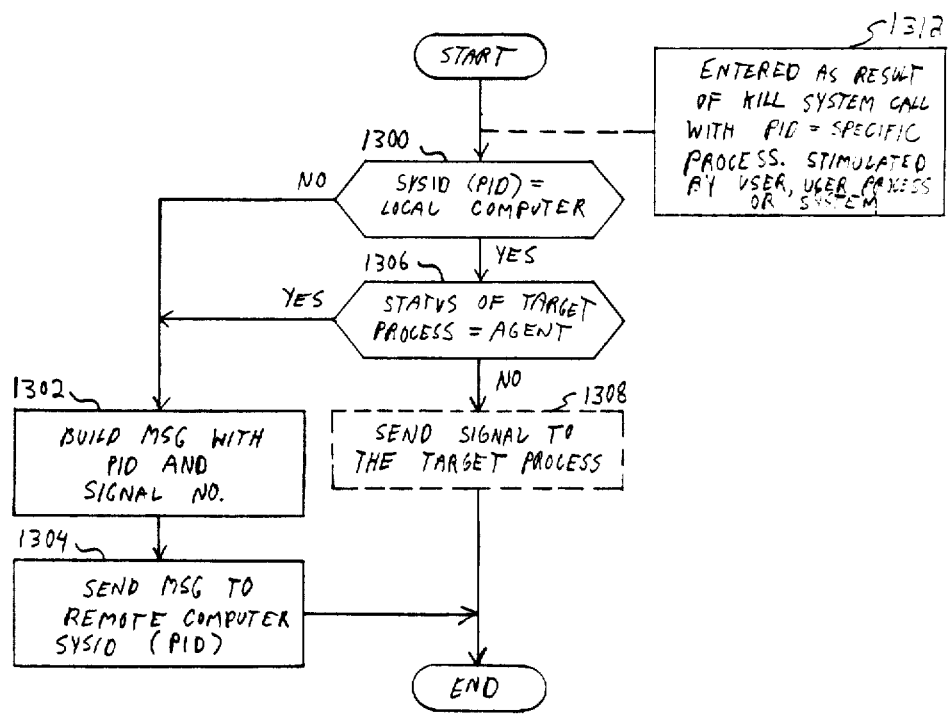

A signal may be sent to a specific process or a whole process group. Specifically, FIG. 11 relates to the processing of a signal for a process group. FIG. 12 shows steps for processing a process group signaling message generated by the program of FIG. 11. FIG. 13 shows steps for processing a signal to an individual process. FIG. 14 shows the associated steps for signaling messages generated by the program of FIG. 13.

Figure 11:
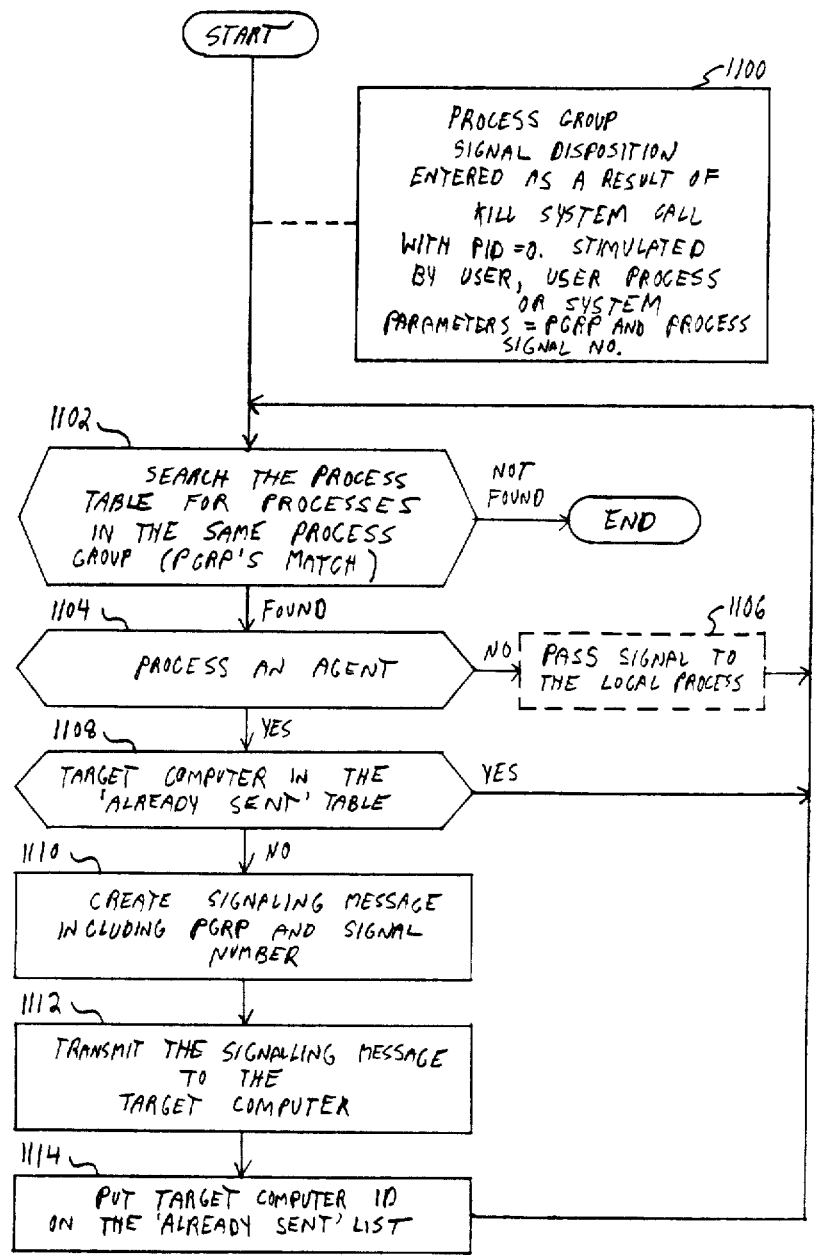

In more detail now, the program in FIG. 11 is entered at START as a result of receiving a signal, generated at the computer on which the FIG. 11 program is executing, and directed to a process group. Note that signals may be generated at either a server or a client. Input parameters are the process group (pgrp) and a signal identifying number. Step 1100 searches the local process table for processes that are defined to be within the same process group. This is determined by comparing pgrp to the pgrp stored with each process in the process table. It is possible for a network computer to be associated with more than one entry in the process table which matches the input parameter pgrp. The purpose of the already sent table is to insure that only one signaling message is sent to such a computer as a result of a process group related signal. Because the already sent table is only temporary, we do not illustrate it for simplicity. If a pgrp match is found, step 1104 determines if the matching process is a local process or an agent for a process being remotely executed. It does this by interrogating the STATUS variable in the appropriate entry of the process table. For a local process, the signal is passed to the process as is now done in present UNIX systems. This is shown conceptually at dotted step 1106 and then the search of the process table for another pgrp match is continued at step 1100. If a matching process is identified as an agent by step 1104, step 1108 determines from the already sent table if a signal message has already been sent to the associated network computer. If so, the search continues at step 1100. Otherwise, a signaling message containing the pgrp and the signal number is created at step 1110 and transmitted to the computer at step 1112. This computer is added to the already sent table at step 1114, after which the search of the process table resumes at step 1100.

The flowchart of FIG. 12 illustrates the process steps executed at a computer upon receipt of a process group signaling message generated by the program of FIG. 11 from another computer. Again, note that signals may be generated at either client or server and communicated to the other. As described above, the process signaling message contains the process group in question and the signal to be processed. Step 1200 begins a search of the process table at the computer to locate a process belonging to the specified process group. If none is found, this program is ended. Assuming that a matching process is found, the associated signal is passed to it for disposition by step 1202, as is done in present UNIX systems. The search of the process table is then resumed for other processes that belong to the specified process group.

FIG. 13 illustrates the program steps that are executed in response to a signal generated locally and directed to a specific process rather than to a process group. The input parameter to this routine is pid. Step 1300 derives the computer identity (sysid) of the process from pid [this derivation is represented by the nomenclature "sysid(pid)"] and determines if the computer on which the process is located is the local computer. There are two ways to transmit a signal to a process: by system function, as discussed above with respect to process group signaling, and by direct command from a user. In either case the signal may be intended for a local process or a remote process. If the answer to the step 1300 query is that the intended process is remote, steps 1302 and 1304 build a signaling message including the supplied pid and transmit it to the remote computer identified by sysid(pid).

If the sysid identifications match at step 1300, the process is local. However, the local process may be an agent process, in which case the signal is really intended for the corresponding remote process. 1306 interrogates the STATUS variable to determine if the local process is an agent. If the local process is not an agent, dotted box 1308 processes the signal in the same way as a standard UNIX system. If the process is an agent, steps 1302 and 1304 build and transmit a signaling message to the remote computer.

FIG. 14 illustrates the program steps performed at a computer in response to receipt of a signal message generated by the program of FIG. 13. Step 1400 searches the process table on this computer for the process identified in the message. If the process is found, the signal is passed to it in a conventional UNIX system manner and control is returned to the main program.

It is understood that the above-described arrangement is merely illustrative of the application of the principles of the invention and that other arrangements may be devised by those skilled in the art without departing from the spirit and scope of the invention.

What is claimed is:

1. A method of performing remote process execution in a computer network having a plurality of computers each with separate file and separate file addressing systems, comprising the steps of
transmitting remote process execution request, including an identification of a process to be executed, from a requesting one of the computers to a serving one of the computers, and
establishing a temporary file addressing system extension at both the requesting and the serving computers for the duration of existence of the remote process in response to said request transmission for linking the file system of the requesting computer into the file system of the serving computer,
addressing, via the extension in response to a remote process file access, a file located at the requesting computer as an integral part of the file system of the serving computer and not a file at the serving computer.

2. The method of claim 1 wherein the step of establishing a file addressing system extension further comprises
establishing one or more communication channels at the requesting computer for direct file access by the serving computer,
including in the remote execution request message information identifying the one or more communication channels at the requesting computer,
at the serving computer, linking the file addressing system to the one or more communication channels extending to the requesting computer, and
activating the identified process at the serving computer.

3. The method of claim 2 further comprising the steps of
establishing at the requesting computer a completion communication channel for receiving a remote process completion signal from the serving computer, and
including in the remote execution request message information by which the serving computer may address the completion communication channel.

4. The method of claim 1 further comprising the steps of
establishing a user process at the requesting computer in response to a login by a user, and
generating the remote execution request message in response to a command from the user identifying the process to be remotely executed.

5. The method of claim 4 further comprising the steps of
including in the remote execution request message information stored at the requesting computer describing the operating environment of the user process, and
at the server computer, establishing a remote process in response to the remote execution request to service the request, and
establishing an operating environment for the remote process using the operating environment information in the remote execution request message.

6. The method of claim 5 wherein the operating environment of a process includes one or more stored environment variables describing prescribed operating conditions for the process and wherein the step of including operating environment information further comprises the steps of
reading the states of environment variables, and
including the environment variable states in the remote execution request message.

7. The method of claim 6 wherein the step of establishing the operating environment for the remote process further comprises the steps of
storing the environment variable states contained in remote process request message in the environment variables associated with the remote process.

8. The method of claim 7 wherein each computer has an individual status variable for each process active in the computer and which contains information describing prescribed states of the process, the method further comprising the steps of
at the requesting computer, setting the status variable for the user process to a state identifying the process as an agent for the remote process, and
placing the agent process in an inactive state awaiting completion of the remote process.

9. The method of claim 1 further comprising the steps of
including in the remote process execution request message file selection information selectively identifying for any file that might be accessed by the remote process whether to access the file on the requesting or the serving computer and,
linking the file selection information into the file addressing extension.

10. The method of claim 2 wherein the file systems of the requesting and serving computers are each hierarchically arranged into a tree structure of directories containing files, beginning with a root directory, and wherein each computer process has associated with it a default root directory pointer and an alternate root directory pointer, and wherein the method further comprises the steps of at the serving computer, setting the state of the default root directory pointer associated with the remote process to point to the root directory of the requesting computer and setting the state of the alternate root directory pointer to point to the root directory of the serving computer in response to file information contained in the remote execution request message.

11. The method of claim 10 further comprising the step of at the serving computer, selecting either the default or the alternate root directory pointer to search for a file referenced by the remote process, in accordance with the file information from the requesting computer.

12. The method of claim 11 wherein files are identified by path names comprising sequence of directories in the file system and ending with a name of a file located in the last named directory, wherein the file information from the requesting computer further comprises one or more directory path names, and wherein the step of selecting either the default or the alternate root directory pointer further comprises the steps of comparing the path name of a referenced file to the one or more directory path names from the requesting computer, and selecting in response to said comparison the alternate root directory pointer to search for the referenced file if any of the one or more directory path names in the file information from the requesting computer is a prefix of the reference file path name and otherwise selecting the default root directory pointer.

13. The method of claim 12 wherein each computer comprises a local DISALLOWED variable which may contain one or more directory path names and wherein the method further comprises the step of at the serving computer, in response to the remote execution request message, comparing each of the one or more directory path names in the file information to each of the path names in the DISALLOWED variable, and deleting from the file information any directory path name which has a directory path name as a prefix in the DISALLOWED variable.

14. The invention of claim 13 wherein one of a plurality of environmental variables of a process identifies a present directory in which the process resides, and wherein the method further comprises the steps of at the requesting computer, establishing a completion communication channel for receiving a remote process completion signal from the server computer, establishing root directory and present directory communication channels for access by the server computer for the requestor computer root directory and the present directory, respectively, and including addressing information of each said communication channel in the remote execution request to the server computer.

* * * * *